United States Patent
Schäty

(10) Patent No.: US 7,048,486 B2
(45) Date of Patent: May 23, 2006

(54) INSERT PART FOR A WALL OPENING, IN PARTICULAR ON A VEHICLE BODY

(75) Inventor: Harald Schäty, Wetzlar (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/614,910

(22) Filed: Jul. 8, 2003

(65) Prior Publication Data

US 2004/0057812 A1    Mar. 25, 2004

(30) Foreign Application Priority Data

Jul. 10, 2002 (DE) .............................. 102 31 273
Jul. 10, 2002 (DE) .............................. 102 31 274

(51) Int. Cl.
F16B 19/00 (2006.01)

(52) U.S. Cl. .................. 411/508; 411/553; 411/82; 411/82.3; 411/258

(58) Field of Classification Search .............. 411/82, 411/82.3, 258, 930, 508, 913, 182, 553; 220/787; 24/297
See application file for complete search history.

(56) References Cited

U.S. PATENT DOCUMENTS

| | | | | |
|---|---|---|---|---|
| RE30,326 E | * | 7/1980 | van Buren, Jr. | .............. 220/326 |
| 4,363,420 A | | 12/1982 | Andrews | |
| 5,193,961 A | | 3/1993 | Hoyle et al. | |
| 5,294,225 A | * | 3/1994 | Kazino et al. | ............... 411/182 |
| 5,367,751 A | * | 11/1994 | DeWitt | ........................ 24/295 |
| 5,505,324 A | * | 4/1996 | Danico | ........................ 220/201 |
| 5,513,769 A | | 5/1996 | de Baets | |
| 5,738,476 A | | 4/1998 | Assimakopoulos | |
| 5,852,854 A | | 12/1998 | Pierrot et al. | |
| 6,481,682 B1 | * | 11/2002 | Miura | ..................... 248/231.9 |

FOREIGN PATENT DOCUMENTS

| | | |
|---|---|---|
| DE | 3100498 | 1/1982 |
| DE | 4423576 | 1/1995 |
| EP | 0 621 169 | 10/1994 |
| EP | 0 675 295 | 10/1995 |
| FR | 002573162 A1 * | 5/1986 |
| GB | 1466563 * | 6/1973 |
| GB | 1466564 * | 6/1973 |

OTHER PUBLICATIONS

European Search Report, No. 03015141.9, (3 pgs).
European Search Report No. 03015160.9 (3 pgs).

* cited by examiner (Continued)

Primary Examiner—Katherine Mitchell
(74) Attorney, Agent, or Firm—Harness, Dickey & Pierce, P.L.C.

(57) ABSTRACT

An insert part (1) for insertion in an opening in a wall has a neck (7) to pass through the opening and a flange (4) arranged on the neck (7) and comprising a depression (5) on the under side facing the neck (7). The depression (5) is bounded on the outside by an elevated circumferential edge and contains a body (17) of adhesive capable of being brought into a flowable state by heating. To secure the insert part in the opening of the wall, catches (8) are attached to the neck (7). The body (17) is of such size that it is completely accommodated by the depression (5), and the insert part (1) is of such conformation that, in the installation position in which it is secured by the catches (8) in the opening of the wall, the circumferential edge (6) of the flange (4) is firmly pressed into contact with the wall.

20 Claims, 4 Drawing Sheets

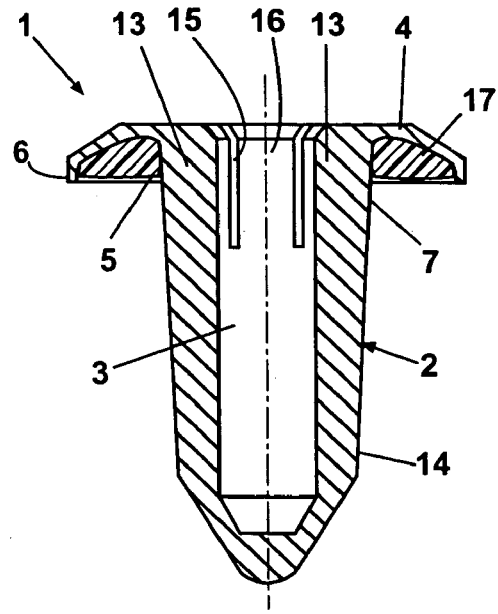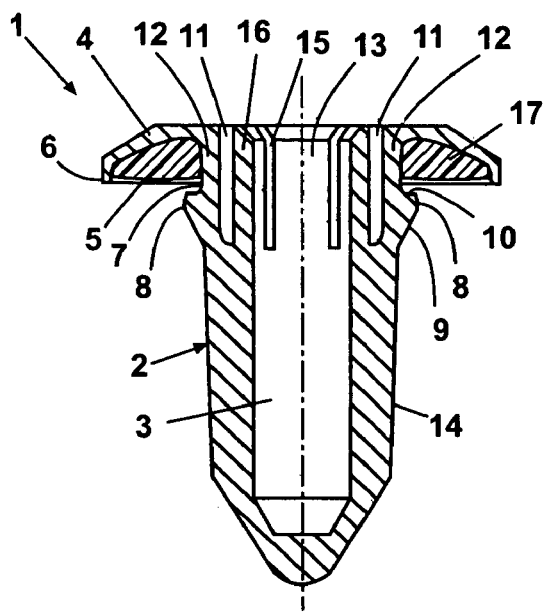
Fig. 5   Fig. 6
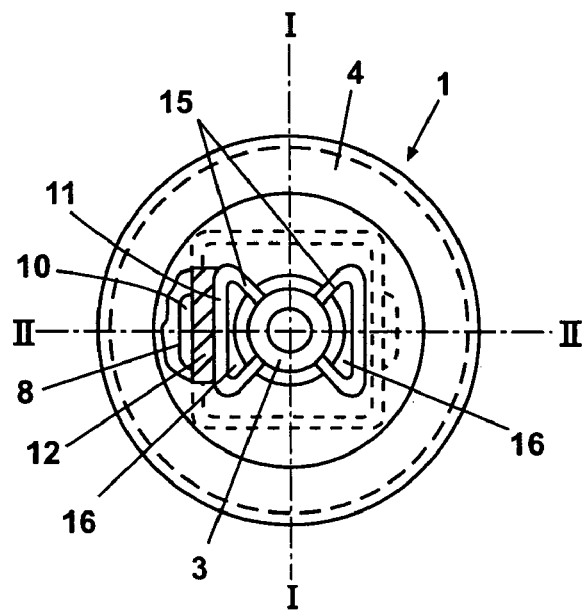
Fig. 7

INSERT PART FOR A WALL OPENING, IN PARTICULAR ON A VEHICLE BODY

CROSS-REFERENCE TO RELATED APPLICATIONS

This application claims the benefit of German Patent Application DE10231274.5, filed Jul. 10, 2002 and German Patent Application DE10231273.7, filed Jul. 10, 2002. The disclosures of the above applications are incorporated herein by reference.

FIELD OF THE INVENTION

The invention relates to an insert part for insertion in an opening in a wall, in particular on a vehicle body, with a neck to pass through the opening, a flange arranged on the neck and covering the marginal portion of the wall around the opening when the insert part is arranged in the opening, which flange comprises a depression on the under side facing the neck and bounded outward by an elevated circumferential edge, with a body of synthetic material arranged in the depression on the under side of the flange, which synthetic material can be brought into a flowable state, and with a retaining means to secure the insert part in the opening of the wall.

The invention also relates to a fastening element for insertion into a rectangular, in particular square, opening in a wall, having a neck to pass through the opening, the cross-sectional contour of the neck being in the shape of a rectangle, in particular a square, having a flange arranged in the neck and covering the marginal portion of the wall around the opening when the fastening element is arranged in the opening, having a bore protruding through the flange into the neck to accommodate a screw, and having at least two spring catches to secure the fastening element in the opening of the wall.

BACKGROUND OF THE INVENTION

Insert parts or fastener elements, hereinafter "insert parts" of the kind specified may be configured either as stoppers for tight closure of a wall opening on a vehicle body or as dowels intended to accommodate a fastening element, for example a screw.

An insert part of the specified kind, configured as a stopper, is disclosed in DE 31 00 498 A1. This stopper comprises a neck engaging the opening and having a plurality of interruptions. In the interruptions, spring engaging elements are arranged, each of which possesses an inclined shoulder. If the stopper is inserted in the wall opening, the shoulders bear on the edge of the opening on the side away from the flange. In this way the flange is pressed in the direction of the wall, and the body of sealing material projecting from the depression in the flange is subjected to pressure. If the inserted stopper is heated to a suitable working temperature below the melting point of the material of the stopper, the body will melt, while the pressure exerted draws the edge of the flange against the surface of the wall and the molten sealing material flows through the sheet-metal opening and fills up the space between the edge of the opening and the neck portions of the stopper. Here it is disadvantageous that the position of the stopper will be altered upon melting of the adhesive, and undesirable deviations of position may result. Furthermore, the molten sealing material may emerge at the circumferential edge of the flange, so long as the circumferential edge is located at a distance from the wall. The application of the known stopper is therefore substantially limited to horizontally oriented walls.

DE 44 23 576 C2 describes a closure having a body of molded adhesive, inserted in an opening arranged in a metal sheet. The body has a circumferential edge that rests on top of the sheet, on the metal edge around the opening. By a plurality of elastic catches, the body is retained on the metal sheet. On top of the circumferential edge of the body, a string of adhesive is laid down. The adhesive, melted by heating, passes through holes in the circumferential edge into a groove on the under side of the edge in contrast with the metal sheet, so that the groove can fill with adhesive to form a firm connection by bonding between the body and the sheet. This closure too is suitable only for openings in walls substantially oriented horizontally.

Such fastening elements are secured against rotation by the neck in the opening of the wall, and may therefore, upon screwing of a fastening screw into the bore, transmit a counter-torque to the wall, opposing the torque that rotates the screw. With the aid of the catches, they are secured against pulling out of the opening. To achieve as strong an axial retaining force as possible, known fastening elements of the kind specified are provided with spring catches on all four sides. Here it has been found that only a limited counter-torque can be achieved for the screwing in. If adverse deviations in dimensions of screw or bore encounter each other, an overrotation of the fastening element and hence an impairment of the assembly operation may result.

The object of the invention is to create an insert part of the kind initially specified, that makes possible the observance of close positional tolerances and suitable also for application to inclined walls. A further object of the invention is also to create a fastening element of the kind initially specified, that, with adequate axial retaining force, can transmit as high a torque as possible to a wall.

SUMMARY OF THE INVENTION

According to the invention, this object is accomplished in that the plastic body is of such size that it is completely accommodated by the depression on the under side of the flange, and in that the insert part is of such conformation that, in the installation position in which the insert part is secured in the opening of the wall by the retaining means, the circumferential edge of the flange is pressed into contact with the wall. The insert part according to the invention has the advantage that when inserted in the opening, it can be brought into an exactly defined position in which it is secured by the retaining means and the circumferential edge of the flange, pressed into contact with the wall, pending final fixation by the melted plastic. Hence strict requirements on the precision of positioning of the insert part can be met.

A further essential advantage consists in that the arrangement of the insert part according to the invention is largely independent of the inclination of the wall in which the opening is located. The circumferential edge of the flange, pressed into contact with the wall, prevents the melted plastic from leaking out of the depression on the flange side prior to renewed consolidation, even with vertical orientation of the wall. In this way, a neat appearance of the bond on the flange side of the insert part is assured, and alteration of the surface around the flange by leaked plastic is avoided.

Surprisingly enough, it has turned out moreover that both in horizontal and also in vertical orientation of the wall, the melted plastic will reliably enter the annular gap between the edge of the opening and the neck of the insert part, and seal it completely. The insert part according to the invention is therefore suitable for tight closing of a wall opening, the edges of the opening being covered by the plastic and thereby protected against corrosion. If a plastic or adhesive having good wetting action is employed for the seal, then even in the case of an overhead arrangement of the insert part, a dependable seal and bond are achieved.

According to a further proposal of the invention, provision may be made so that the flange of the insert part is elastically deformable transverse to its extent, and so that the retaining means for securing the insert part in the opening of the wall are of such configuration that the installation position of the insert part is attainable only by elastic deformation of the flange bearing on the wall by its circumferential edge. In this way, the flange forms a spring element that is tensed upon installation of the insert part, and generates the desired force to press the circumferential edge into contact. In this way, by simple means, an adequate spring travel is achieved to compensate deviations of dimensions in manufacture. In addition, the flange can be adapted to deviations in the shape of the wall. Instead of an elastically deformable flange, according to the invention, alternatively the retaining means may comprise spring elements that, in installation position, generate a force pressing the circumferential edge of the flange into contact.

As retaining means, the insert part preferably comprises at least two spring catches, each having an entry incline and a bearing surface, the entry incline serving to compress the catches on insertion in a wall opening, and the bearing surfaces being suitable, after relief of the catches, for bearing on the wall on the side away from the flange. The catches, according to the invention, may be integrated into an elastically deformable wall segment of the neck without interruption. This has the advantage that the neck can be configured as an attached ring, favoring uniform distribution of the adhesive in the bonding join formed by the neck and the edge of the opening.

According to a further proposal of the invention, the insert part comprises a shank prolonging the neck on the side away from the flange and containing a bore passing through neck and flange to accommodate a fastening element. The free end of the shank may be closed to make possible a tight closure of the opening.

According to the invention, the cross sectional contour of the neck may be circular or elliptical or in the shape of a polygon, in particular a square. In cooperation with a correspondingly shaped opening, the insert part is secured against rotation in the opening and may therefore, for example when a fastening screw is screwed in, transmit a counter-torque to the wall, acting against the screw-in torque. To transmit as high a counter-torque between insert part and wall as possible, according to a further proposal of the invention, provision is made for the neck to have a square cross-sectional contour and to comprise outward-projecting catches on two opposed sides only, the walls bearing the catches being subdivided by recesses extending in lengthwise direction into an outer, spring wall segment and an inner, spring wall segment. By this conformation, given adequate elasticity in the neighborhood of the catches, a torsionally rigid neck is created, suitable for transmitting comparatively great torques to the wall.

It is advantageous further if the insert part, on the outside of the neck at a parallel distance from the flange, comprises rib-like projections which, upon insertion of the insert part, can be thrust through the opening in the wall. Preferably, the projections have lead-in inclines facing away from the flange and boundary surfaces facing the flange, said boundary surfaces lying in the plane of the abutments of the catch lugs. The projections seal the annular gap present between the neck of the insert part and the edge of the opening in which the insert part is inserted, to such an extent that the molten material of the synthetic member is retained in the annular gap, and a dependable sealing and bonding of the insert part in the wall opening is ensured.

According to the invention, the object is accomplished in that catches are provided exclusively on two opposed sides of the neck, and integrated in each instance in an elastically deformable wall segment of the neck, and in that the elastically deformable wall segments are connected by two rigid wall segments not bearing any catches.

It has been found that by the conformation of the fastening element according to the invention, an adequate elasticity in the region of the catches, an adequate retaining force and a torsionally rigid neck can be created, suitable for transmitting comparatively high torques to the wall. The fastening element is therefore especially suitable for self-threading and self-locking screws, requiring a comparatively high screw-in torque.

The walls bearing the catches may, according to a further proposal of the invention, be subdivided by recesses extending in lengthwise direction into an outer, spring wall segment and an inner, spring wall segment.

According to a further proposal of the invention, provision may be made so that the flange in the fastening element is elastically deformable transverse to its extent and so that the retaining means for securing the fastening element in the opening of the wall are of such configuration that the installation position of the fastening element can be achieved only by elastic deformation of the flange supported on the wall by its circumferential edge. In this way, the flange forms a spring element that, upon assembly of the fastening element, is tensed, and holds the fastening element without play in axial direction. In addition, by simple means, an adequate spring travel is achieved to compensate for deviations of dimensions in manufacture.

The catches preferably each have an introductory incline and a bearing surface, the introductory inclines serving to press the catches together upon insertion in a wall opening, and the bearing surfaces being suitable, after release of the catches, to bear against the wall on the side away from the flange.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will be illustrated in more detail below in terms of an embodiment by way of example, represented in the drawing. Specifically:

FIG. 5 is a cross sectional side elevational view of an insert part according to the invention, configured as a dowel and taken from section I—I of FIG. 7;

FIG. 6 is a cross sectional front elevational view of the insert part according to FIG. 7, taken from section II—II of FIG. 7;

FIG. 7 is a plan view of the flanged end of the insert part according to FIG. 5;

DETAILED DESCRIPTION OF THE PREFERRED EMBODIMENTS

The following description of the preferred embodiments is merely exemplary in nature and is in no way intended to limit the invention, its application, or uses.

Figure 1:
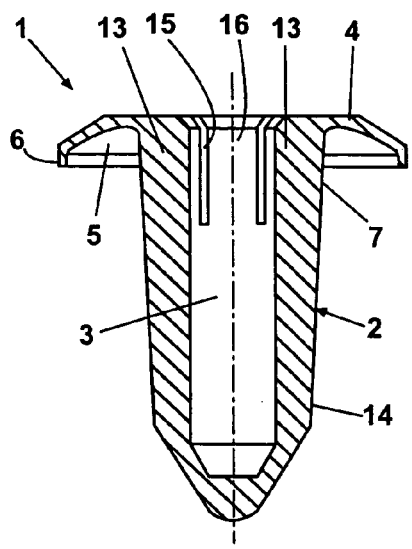
FIG. 1 is a cross sectional side elevational view of an insert part according to the invention, configured as a dowel and taken from section I—I of FIG. 3.
Figure 2:
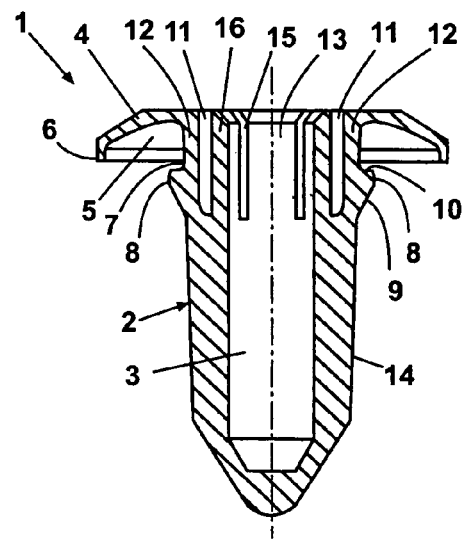
FIG. 2 is a cross sectional front elevational view of the insert part according to FIG. 1 and taken from section II—II of FIG. 3.
Figure 3:
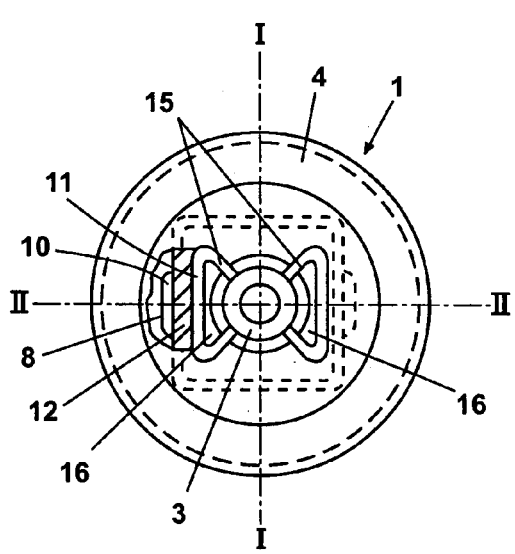
FIG. 3 is a plan view of the flanged end of the insert part according to FIG. 1.

The insert part 1 represented in FIGS. 1 to 3 is a dowel of synthetic material, e.g., a plastic dowel, intended for insertion in a square opening in a wall of sheet metal, for example on a vehicle body, so that an attachment can be fastened to the wall by means of a screw screwed into the dowel. The dowel is moreover to tightly close the opening in which it is inserted.

The insert part 1 includes an elongated sleeve 2 having a central bore 3 closed at one end. At the open end of the sleeve 2, a circular flange 4 arranged coaxial with the bore 3 is molded on, projecting from the sleeve 2 on all sides. The flange 4, on its under side facing the sleeve 2, comprises an annular depression 5. Radially inward, the depression 5 is bounded by the outer surface of the sleeve 2, and radially outward, by a circumferential edge 6 of the flange 4.

The outer surface of the sleeve 2 has essentially the shape of a step pyramid with square base, the apex of the pyramid forming the closed end of the sleeve. The foot of the pyramid, adjacent to the flange 4, forms a neck 7 which, in installation position of the insert part 1, engages the wall opening. By its quadrangular shape, the neck 7 is secured against rotation in a suitably shaped opening, and is able to transmit a counter-torque to the wall, acting against the screw-in torque of a screw being screwed into the bore 3.

On two opposed sides, the neck 7 comprises outward projecting catches 8 having entry inclines 9 facing towards the closed end of the sleeve, and bearing surfaces 10 located opposed to the flange 4. In the neighborhood of the catches 8, the wall of the sleeve is weakened by recesses 11 extending parallel to the bore 3. In this way, the elastic deformability of the wall segment 12 bearing the catches 8 is enhanced to such an extent that the catches 8, upon insertion of the insert part 1 in an opening, can be pressed inward by contact of their entry inclines 9 with the edge of an opening, in order to pass through the wall opening, narrower compared to the projection distance of the catches 8. The bearing surfaces 10 of the catches 8 are intended to lie in contact with the side of the wall accommodating the insert part 1 opposed to the flange 4. Their distance from the plane of contact of the circumferential edge 6 is somewhat smaller than the thickness of the wall for which the insert part is intended. If the insert part 1 is inserted in the opening of the wall, therefore, axial pressure on the sleeve 2 must elastically deform the flange 4 resting in contact with the wall by its circumferential edge 6, so that the catches 8 on the other side can emerge from the wall opening and there bring their bearing surfaces 10 into contact with the wall. The wall segments 13 of the neck 7 that do not bear any catches 8 are of rigid configuration. Thus they make possible the absorption/accommodation of high retaining forces and the transmission of a high torque to the wall accommodating the insert part 1.

The segment of the sleeve 2 adjacent to the neck 7 forms a shank 14 whose pyramid apex facilitates introduction of the insert part 2 into an opening. The recesses 11 are connected to the bore 3 at their lateral ends by radial slits 15. This forms radially springing tongues 16 pressed radially outward by screwing of a screw into the bore and laid in contact with the wall segments 12. The screw thread cuts only into the wall segments 13 and the wall of the shank 14. The tongues 16 fill up the interval between the screw and the wall segments 12, thereby bearing radially inward on the wall segments 12. This locks the catches 8 in their retaining position, so that the insert part 1 installed (or mounted) in a wall opening is additionally (actually) secured against loosening (release).

Figure 4:
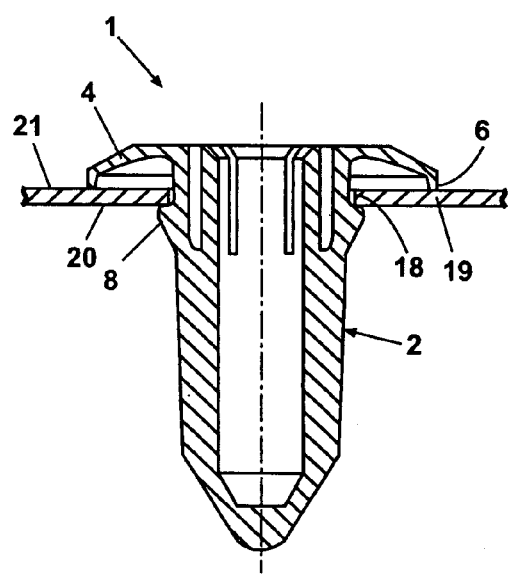
FIG. 4 is a cross sectional front elevational view of the insert part similar to FIG. 2, the insert part further shown inserted in the opening of a wall.

In FIG. 4, the installation of the insert part 1 is illustrated. The insert part 1 is here located in a square opening 18 in a wall 19. In this position, it is firmly held by the catch 8, whose bearing surfaces 10, viewed in the direction of insertion, rest in contact with the posterior wall surface 20. The flange 4, at installation of the insert part 1, was elastically deformed by pressure on the sleeve 2 against the direction of insertion, and therefore bears on the anterior wall surface 21 by its circumferential edge 6 with a force matching the deforming force.

FIGS. 5–9 represent an alternate embodiment similar to FIGS. 1–4, having the same parts similarly numbered. Only the differences will therefore be further discussed. To seal an opening accommodating the insert part 1 in a wall and to connect the insert part 1 to this wall by bonding, a ring 17 of adhesive is arranged in the depression 5 of the flange 4. The ring 17 may be pre-formed as a separate element and then inserted in the depression 5. Alternatively, however, the adhesive may be placed in the depression in fluid or viscid form, so as to form a closed ring adhering there. As adhesive, preferably a plastic composed of several components is employed, which melts upon heating to a reaction temperature, thereby penetrates into the joins to be sealed and bonded, and then consolidates and sets. By means of such an adhesive, the insert part 1 may advantageously be inserted in the course of fabrication of vehicle bodywork. Here the insert part 1 may be installed after painting. If the bodywork then passes through a combustion chamber, the adhesive is activated and the part is sealed and bonded.

Figure 8:
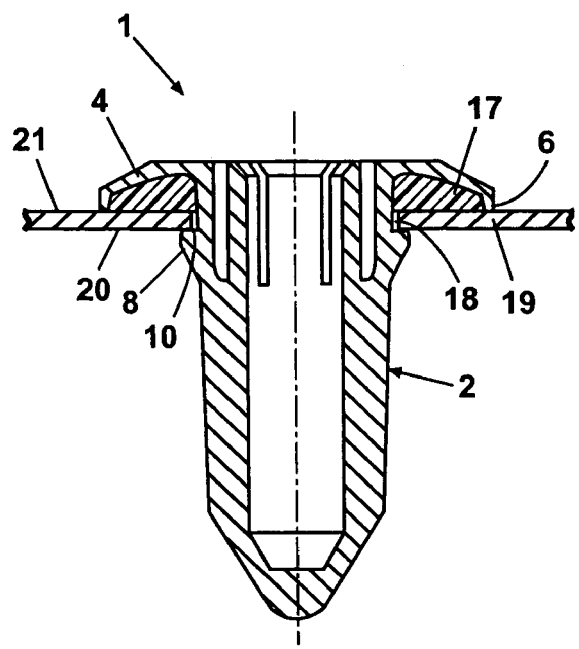
FIG. 8 is a cross sectional front elevational view the insert part of FIG. 6, further shown inserted in the opening of a wall, before melting of the adhesive.
Figure 9:
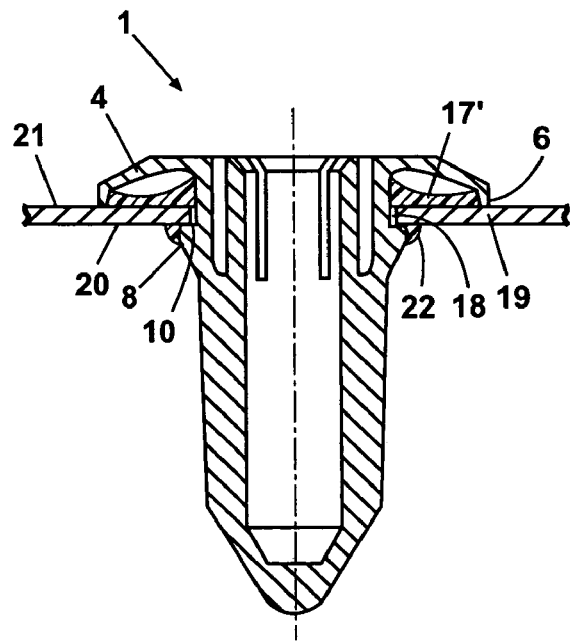
FIG. 9 is a cross sectional front elevational view of the insert part of FIG. 6, further shown inserted in the opening of a wall, after bonding.

In FIGS. 8 and 9, the installation and bonding of the insert part 1 are illustrated. The insert part 1 is here located in installation position in a square opening 18 in a wall 19. In this position, it is retained by the catches 8, whose bearing surfaces 10 lie in contact with the posterior wall surface 20, as viewed in the direction of insertion. The flange 4 at installation of the insert part 1 was elastically deformed by pressure on the sleeve 2 contrary to the direction of insertion, and therefore its circumferential edge 6 bears on the interior wall surface 21 with a force matching that of deformation. In this way, the circumferential edge 6 seals off the depression 5 sufficiently from the wall surface 21, so that no appreciable amount of adhesive can leak upon fusion of the ring 17.

FIG. 9 shows the distribution of the melted adhesive 17' at the end of the flowing and setting process initiated by heating. Here the adhesive 17' has completely penetrated the gap between the wall 19 and the insert part 1, and in addition has formed a bulge 22 around the insert part 1 at the posterior wall surface 20. On the anterior wall surface 21 also, owing to unevenness in the surfaces of contact giving rise to minute crevices, adhesive 17' can penetrate into the zone of contact and possibly wet the outer extremity of the circumferential edge 6. However, leakage of an amount of adhesive impairing the visual appearance at the anterior wall surface 21 is effectively prevented, even if the wall 19 is in a vertical position. After setting of the adhesive 17', the insert part 1 forms a liquid- and gas-tight closure of the opening 18 and a place for attachment of a part with comparatively high retaining forces. The edges of the opening 18 are completely covered by the adhesive 17', providing good protection against corrosion.

The insert part described may also be employed to advantage without use of a ring 17 of adhesive and bonding after installation if a seal of the wall opening is not required, since the catches 8 themselves generate a retaining force sufficient for many purposes, and this solution has advantages of cost. This embodiment is as shown and described in reference to FIGS. 1–4.

Figure 10:
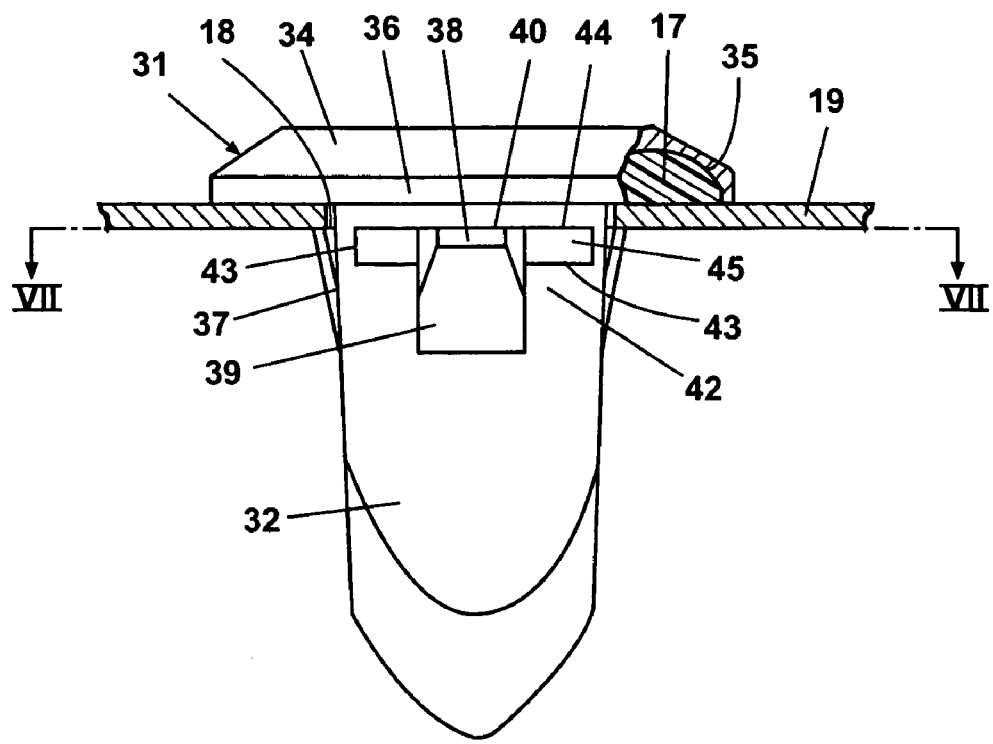
FIG. 10 is partial cross sectional elevational view of another conformation of the insert part according to the invention, configured as a dowel.
Figure 11:
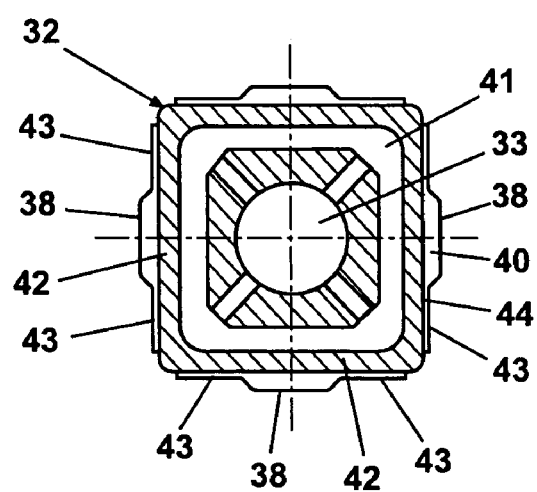
FIG. 11 is a partial cross sectional plan view of the insert part according to FIG. 10 taken at section line VII—VII of FIG. 10.

FIGS. 10 and 11 show an insert part 31 modified relative to the insert part 1 and described in detail as follows. The insert part 31 is likewise a dowel of synthetic material, insertable in a square opening 18 in a wall 19, e.g. of sheet metal, and serving to accommodate a fastening element, for example a screw. The insert part 31 as an elongated sleeve 32, a central bore 33 and a flange 34 with a circular circumferential edge 36 and an annular depression 35 to accommodate a ring 17 of adhesive. Adjacent to the flange 34, the sleeve 32 comprises a sleeve 37 of square cross-sectional shape, bearing a catch 38 projecting outward on each of its four external sides. The catches 38 have lead-in inclines facing the closed end of the sleeve 39 and abutment surfaces 40 located opposed to the flange 34. In the interior of the sleeve 37, there is an annular recess 41 encircling the bore 33. Thus the elastic deformability of the wall segments 42 bearing the catches 38 is enhanced, so that the catches 38 can be compressed, with deformation of the wall segments 42, upon insertion of the insert part in the opening 18 of the wall 19.

On either side of the catches 38, immediately adjacent thereto, there are rib-like projections 43 extending in a direction parallel to the flange 34, in each instance as far as the corners of the sleeve 32. The projections 43 have boundary surfaces 44 facing the flange 34, lying in the plane of the abutment surfaces 40 of the catches 38, and lead-in inclines 45 facing the closed end of the sleeve. The height of the projections 43, measured perpendicular to the outer surface of the sleeve 32, is substantially less than the height, measured in like manner, of the catches 38, and is only about one-third to one-fifth of the height of the catches 38.

When mounting the insert part 31, the projections 43 as well as the catches 38 are pushed through the opening 18 in the wall 19, so that they are located, in installation position of the insert part 31, on the side of the wall 19 away from the flange 34. The function of the projections 43 is to additionally seal the annular gap between the neck 37 of the insert part 1 and the edge of the opening 18 in the wall 19, so that upon fusion of the ring 17, consisting of adhesive, an adequate quantity of adhesive will be retained in the annular gap, even in adverse installation position, thereby achieving a dependable seal between the insert part 31 and the wall 19. The height of the projections 43 is here so dimensioned that with manufacturing tolerances, in the case of maximum outside dimension of the insert part and minimum dimension of the opening, the insert part can still be forced into the opening in the position of installation with sufficiently little force, and in case of minimum outside dimension of the insert part and maximum inside dimension of the opening, an adequate seal will still be achieved between the insert part and the wall to retain the molten adhesive. The mounting and configuration of the projections 43 have the advantage that, compared to the embodiment according to FIGS. 5 to 9, greater manufacturing tolerances can be allowed without compromising the installation and the tight bonding of the insert part.

Even though the conformation of the projections 43 as described is highly advantageous, the invention is by no means limited thereto. Instead of the wedge shape shown, the projections 43 may alternatively be configured as convex beads, ribs or the like, or take the form of sealing lips.

What is claimed is:

1. A vehicle insert part system, comprising:
   a vehicle body wall having an opening and a marginal portion; and
   an insert part including:
   (a) a neck adapted to pass through the opening, the neck having oppositely positioned first and second recesses, the first and second recesses each having opposed lateral ends; and
   (b) a flange arranged on the neck having an underside facing the neck, the flange operable to cover the marginal portion of the wall adjacent the opening, the flange further including:
     (i) a depression on the under side, bounded on an outside by an elevated circumferential edge;
     (ii) a plastic body arranged in the depression, the plastic body capable of being brought into a flowable state; and
     (iii) a retainer operable to secure the insert part in the opening of the wall;
     (iv) a circular bore extending through the flange and partially extending through the neck;
   each of the recesses being in open communication with the bore by first and second slits each extending radially outward from the bore to one of the lateral ends of each of the recesses, any one of the first and second recesses together with its first and second slits together defining a substantially triangular shape;
   wherein the plastic body is completely accommodated within the depression, and in an installed position having the insert part secured in the opening of the wall by the retainer, the circumferential edge is operably pressed into contact with the wall.

2. The insert part system of claim 1, wherein the flange comprises a surface of contact operatively formed by the circumferential edge, the flange being operatively deformable transverse to the surface of contact.

3. The insert part system of claim 1, comprising an arrangement of the retainer operable to secure the insert part in the opening of the wall, wherein in the installed position of the insert part, the flange bearing on the wall with the circumferential edge is elastically deformed.

4. The insert part system of claim 1, wherein the retainer comprises a plurality of spring elements which, in the installed position, operatively generate a force pressing the circumferential edge of the flange into contact with the wall.

5. The insert part system of claim 1, comprising first and second spring catches each having an entry incline and a bearing surface, each entry incline operatively compressing one of the first and second catches upon insertion in the opening, and each bearing surface operatively bearing on the wall on a wall side opposite to the flange after a retro-deformation of both of the first and second catches.

6. The insert part system of claim 5, comprising an elastically deformable wall segment of the neck having the catches integrated into the wall segment.

7. The insert part system of claim 5, comprising a plurality of rib projections located on an outside of the neck, each equidistant from the flange, which upon insertion of the insert part are operatively thrust through the opening of the wall.

8. The insert part system of claim 7, wherein the projections comprise:
a plurality of lead-in inclines facing away from the flange; and
a plurality of boundary surfaces facing the flange, the boundary surfaces lying in a plane of the bearing surfaces of the catches.

9. The insert part system of claim 1, comprising:
a shank extending the neck away from the flange.

10. The insert part system of claim 9, comprising a closed, free end of the shank.

11. The insert part system of claim 1, wherein the neck comprises a cross-sectional contour having a polygon shape.

12. The insert part system of claim 1, wherein the neck comprises:
a square cross-sectional contour forming a plurality of walls;
a plurality of catches projecting outward from an opposed two of the walls;
a plurality of recesses extending in a lengthwise direction; and
each wall having the catches being subdivided by the recesses into a first springing wall segment and a second springing wall segment, the second springing wall segment being positioned radially inward with respect to the first springing wall segment.

13. The insert part system of claim 12, comprising:
each inner wall segment operably forms one of a plurality of spring tongues extending in a lengthwise direction of the bore; and
a radial slot opening into each of the recesses operatively laterally freeing each of the spring tongues.

14. The insert part system of claim 12, wherein the plurality of walls includes walls lacking the catches, each of the walls lacking the catches comprising a rigid wall.

15. The insert part of claim 1, comprising at least two spring catches each having an entry incline and a bearing surface, the entry incline operative to compress the catches upon insertion in a mating component opening, and the bearing surface operatively bearing on a wall adjacent to the opening and opposite to the flange after a retro-deformation of the spring catches.

16. The insert part system of claim 15, further comprising an elastically deformable wall segment of the neck wherein the spring catches are integrally connectable to the wall segment.

17. An insert part, comprising:
a neck having oppositely positioned first and second recesses, the first and second recesses each having opposed lateral ends;
a flange arranged on the neck having an underside facing the neck, the flange further including:
(i) a depression on the under side, bounded on an outside by an elevated circumferential edge;
(ii) a plastic body arranged in the depression, the plastic body capable of being brought into a flowable state;
(iii) a retainer; and
(iv) a circular bore extending through the flange and partially extending through the neck;
each of the recesses being in open communication with the bore by first and second slits each extending radially outward from the bore to one of the lateral ends of each of the recesses, any one of the first and second recesses together with its first and second slits together defining a substantially triangular shape;
wherein the plastic body is completely accommodated within the depression, and the circumferential edge is elastically deformable, such that in an installation position the insert part is operably securable against the retainer by elastic deformation of the circumferential edge and the plastic body being brought into the flowable state.

18. The insert part of claim 17, wherein the flange further comprises a surface of contact operatively formed by the circumferential edge, the flange being operatively deformable transverse to the surface of contact.

19. The insert part of claim 17,
wherein the first and second recesses define a plurality of spring elements operable when displaced to generate a force against the neck.

20. An insert part adapted for engagement with a panel, comprising:
a rectangular shaped neck having oppositely first and second recesses each positioned proximate to one of an opposed pair of sides of the neck, the first and second recesses each having opposed lateral ends;
a flange having a panel engagement side, the flange further including:
a depression on the panel engagement side; and
an adhesive arranged in the depression, the adhesive capable of being brought into a flowable state;
a circular bore extending through the flange and partially extending through the neck;
each of the recesses being in open communication with the bore by first and second slits each extending radially outward from the bore to one of the lateral ends of each of the recesses, any one of the first and second recesses together with its first and second slits together defining a substantially triangular shape; and
a retainer connectable to the flange and operable to at least temporarily attach the insert part to the panel;
wherein the adhesive is entirely accommondated within the depression, and when the adhesive is brought into the flowable state at least a portion of the adhesive is transferrable into a junction between the flange and the retainer to operably secure the insert part to the panel.

* * * * *

UNITED STATES PATENT AND TRADEMARK OFFICE
CERTIFICATE OF CORRECTION

| | | |
|---|---|---|
| PATENT NO. | : 7,048,486 B2 | Page 1 of 1 |
| APPLICATION NO. | : 10/614910 | |
| DATED | : May 23, 2006 | |
| INVENTOR(S) | : Harald Schäty | |

It is certified that error appears in the above-identified patent and that said Letters Patent is hereby corrected as shown below:

Column 10,
Line 39, after "oppositely" insert -- positioned --.
Line 59, after "is" insert -- initially --.

Signed and Sealed this

Eighth Day of May, 2007

JON W. DUDAS
*Director of the United States Patent and Trademark Office*